United States Patent
Kiraly et al.

(10) Patent No.: US 7,349,563 B2
(45) Date of Patent: Mar. 25, 2008

(54) SYSTEM AND METHOD FOR POLYP VISUALIZATION

(75) Inventors: Atilla Peter Kiraly, Plainsboro, NJ (US); Carol L. Novak, Newtown, PA (US); Bernhard Geiger, Cranbury, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 638 days.

(21) Appl. No.: 10/873,337

(22) Filed: Jun. 22, 2004

(65) Prior Publication Data

US 2005/0107695 A1 May 19, 2005

Related U.S. Application Data

(60) Provisional application No. 60/482,591, filed on Jun. 25, 2003.

(51) Int. Cl.
*G06K 9/00* (2006.01)
*G01N 23/04* (2006.01)

(52) U.S. Cl. .................. 382/128; 128/922; 378/62

(58) Field of Classification Search ........ 382/128–134; 128/922; 378/4, 8, 15, 19, 62, 901
See application file for complete search history.

(56) References Cited

U.S. PATENT DOCUMENTS

| 6,366,800 | B1 |   | 4/2002  | Vining et al. |
| 6,525,729 | B1 | * | 2/2003  | Akerman et al. ........... 345/426 |
| 6,658,143 | B2 | * | 12/2003 | Hansen et al. ............. 382/133 |
| 6,744,911 | B1 | * | 6/2004  | Avila et al. ................. 382/131 |
| 6,970,592 | B2 | * | 11/2005 | Fujimoto et al. ........... 382/154 |
| 7,194,117 | B2 | * | 3/2007  | Kaufman et al. ........... 382/128 |
| 2003/0202689 | A1 | * | 10/2003 | Hansen et al. ............. 382/133 |
| 2004/0101184 | A1 | * | 5/2004  | Sivaramakrishna et al. . 382/131 |
| 2004/0228529 | A1 | * | 11/2004 | Jerebko et al. ............. 382/173 |
| 2005/0020912 | A1 | * | 1/2005  | Kiraly et al. ............... 600/425 |
| 2007/0003131 | A1 | * | 1/2007  | Kaufman ................... 382/154 |

OTHER PUBLICATIONS

Gobbetti E et al: "Interactive virtual angi oscopy" VISUALIZATION '98. Proceedings Research Triangle Park, NC, USA Oct. 18-23, 1998, Piscataway, NJ, USA,IEEE, US, Oct. 18, 1998, pp. 435-438,561, XP010321024 ISBN: 0-8186-9176-X abstract section "1 Motivation" p. 437, left-hand col., lines 1-13 p. 438, left-hand col., lines 34-38 p. 438, right-hand col., lines 46-50.

Kiraly A P et al: "Analysis of branching tubular structures in 3d digital images" Proceedings 2002 International Conference on Image Processing. ICIP 2002. Rochester, NY, Sep. 22-25, 2002, International Conference on Image Processing, New York, NY : IEEE, US, vol. vol. 2 of 3, Sep. 22, 2002, pp. 333-336, XPO 10607976 ISBN: 0-7803-7622-6 p. 333 p. 335, left-hand col., lines 4-24 p. 336, left-hand col., lines 7-9, 47-52—right-hand col., line 2.

* cited by examiner

*Primary Examiner*—Aaron W Carter
(74) *Attorney, Agent, or Firm*—Donald B. Paschburg; F. Chau & Associates, LLC (57) ABSTRACT

A system and method for determining a location and a direction for viewing a protrusion, comprising: casting a plurality of rays in an outward direction from a point, wherein the point is inside a protrusion; selecting at least one of the plurality of rays for determining a location and a direction for viewing the protrusion; and determining the location and the direction for viewing the protrusion using the selected at least one of the plurality of rays.

37 Claims, 6 Drawing Sheets

SYSTEM AND METHOD FOR POLYP VISUALIZATION

CROSS-REFERENCE TO RELATED APPLICATIONS

This application claims the benefit of U.S. Provisional Application No. 60/482,591, filed Jun. 25, 2003, a copy of which is herein incorporated by reference.

BACKGROUND OF THE INVENTION

1. Technical Field

The present invention relates to three-dimensional (3D) visualization of medical images, and more particularly, to a system and method for determining a location and a direction for viewing a protrusion, such as a colonic polyp, in a medical image.

2. Discussion of the Related Art

In the field of medical imaging, various systems have been developed for generating medical images of various anatomical structures of individuals for the purposes of screening and evaluating medical conditions. These imaging systems include, for example, computed tomography (CT) imaging, magnetic resonance imaging (MRI), positron emission tomography (PET), etc. Each imaging modality may provide unique advantages over other modalities for screening and evaluating certain types of diseases, medical conditions or anatomical abnormalities, including, for example, colonic polyps, aneurysms, lung nodules, calcification on heart or artery tissue, cancer micro-calcifications or masses in breast tissue, and various other lesions or abnormalities.

For example, CT imaging systems can be used to obtain a set of cross-sectional images or two-dimensional (2D) "slices" of a region or interest (ROI) of a patient for purposes of imaging organs and other anatomies. The CT modality is commonly employed for purposes of diagnosing disease because such a modality provides precise images that illustrate the size, shape, and location of various anatomical structures such as organs, soft tissues, and bones, and enables a more accurate evaluation of lesions and abnormal anatomical structures such as cancer, polyps, etc.

One method that physicians, clinicians, radiologists, etc., use for diagnosing and evaluating medical conditions is to manually review hard-copies (X-ray films, prints, photographs, etc.) of medical images that are reconstructed from an acquired dataset, to discern characteristic features of interest. For example, CT image data that is acquired during a CT examination can be used to produce a set of 2D medical images (X-ray films) that can be viewed to identify potential abnormal anatomical structures or lesions by a trained physician, clinician, radiologist, etc. However, three-dimensional (3D) renderings of the 2D data typically enable, for example, a trained radiologist to determine whether a suspicious structure is truly an abnormality.

Various image processing systems and tools have been developed to assist physicians, clinicians, radiologists, etc. in evaluating medical images to diagnose medical conditions. For example, computer-aided detection and/or diagnosis (CAD) tools have been developed for various clinical applications to provide automated detection of medical conditions in medical images. In general, CAD systems employ methods and/or techniques for digital signal processing of image data (e.g., CT data) to automatically detect colonic polyps and other abnormal anatomical structures such as lung nodules, lesions, aneurysms, calcification on heart or artery tissue, micro-calcifications or masses in breast tissue, etc. In addition, examination tools have been developed that allow a user to select and annotate portions of the image data. The CAD and examination tools are used to produce locations within the image data that may be examined with both 2D and 3D rendering techniques.

One technique that is used in conjunction with conventional CAD tools is a virtual colonoscopy. When conducting a virtual colonoscopy, a functional model is used to explore a virtual space rendered from three-dimensional (3D) images acquired by a scanner. One such model is a virtual camera, which can be used as a point of reference for the viewer and/or operator, e.g., a radiologist located at a workstation, to explore the virtual space. Typically, the operator has two types of camera control from which they can use to navigate through the virtual space.

The first gives the operator full control of the camera, which allows the operator to manipulate the camera in different positions and orientations to achieve a desired view. In other words, the operator can pilot the camera. This allows the operator to explore a particular section of interest while ignoring other sections. However, complete control of a camera in a large virtual domain is tedious and tiring, and the operator might not view all the important features such as colonic polyps during their exploration.

The second technique of camera control is a pre-planned navigation method, which assigns the camera a predetermined path to take and which does not require intervention by the operator. In other words, the operator has engaged an "autopilot". This allows the operator to concentrate on the virtual space being viewed, and not have to worry about steering into walls of the environment being examined. However, this second technique may not give the operator sufficient time to fully investigate an interesting area viewed along the flight path.

Accordingly, there is a need for a technique that incorporates data output using CAD methods or data from a manual examination so that a medical expert can navigate through a virtual space and examine detected or marked locations in a short amount of time.

SUMMARY OF THE INVENTION

The present invention overcomes the foregoing and other problems encountered in the known teachings by providing a system and method for determining a location and a direction for viewing a protrusion.

In one embodiment of the present invention, a method for determining a location and a direction for viewing a protrusion, comprises: casting a plurality of rays in an outward direction from a point, wherein the point is inside a protrusion; selecting at least one of the plurality of rays for determining a location and a direction for viewing the protrusion; and determining the location and the direction for viewing the protrusion using the selected at least one of the plurality of rays. The plurality of rays are cast in one of a spherical and an ellipsoidal formation. The protrusion is one of a nodule, lesion, polyp, pre-cancerous growth, and cancerous growth.

The method further comprises: acquiring a medical image comprising the protrusion, wherein the medical image is acquired by one of a computed tomographic (CT), helical CT, x-ray, positron emission tomographic, fluoroscopic, ultrasound, and magnetic resonance (MR) imaging technique. The method also comprises: detecting the protrusion using a computer-aided protrusion detection technique; storing the determined location and direction for viewing the protrusion; and viewing the protrusion from the determined location and direction for viewing the protrusion. The point is manually selected by a user. The point is a center-point of the protrusion.

One of the plurality of rays that has traveled a shortest distance from the point to a surface of the protrusion is selected to determine the location and the direction for viewing the protrusion. The plurality of rays that stop at a voting surface of the protrusion are used to determine one of the plurality of rays that has traveled a shortest distance from the point to the surface of the protrusion. The stopping point of the plurality of rays is determined by a gradient of an image, wherein the stopping point is used to determine one of the plurality of rays that has traveled a shortest distance from the point to the surface of the protrusion. The stopping point of the plurality of rays is also determined using an air threshold, wherein the stopping point is used to determine one of the plurality of rays that has traveled a shortest distance from the point to the surface of the protrusion.

A group of the plurality of rays that has traveled a shortest average distance from the point to a surface of the protrusion is selected to determine the location and the direction for viewing the protrusion. An opposite direction of the selected at least one of the plurality of rays determines the direction for viewing the protrusion. The location for viewing the detected protrusion is determined by selecting a point along an extended direction of the selected at least one of the plurality of rays. The selected point is one of a fixed distance from the surface of the protrusion and a longest the selected ray can be extended within the air to the fixed distance. The fixed distance is based on an estimated size of the protrusion.

When a surface point on the protrusion is determined by one of the selected rays and a group of rays, a second plurality of rays is cast from the surface point into an air region of a lumen. The second plurality of rays is cast in one of a spherical and an ellipsoidal formation. A longest ray of the second plurality of rays is selected for determining the location and the direction for viewing the protrusion, wherein the direction for viewing the protrusion is opposite the direction of the selected longest ray. The location is determined using one of a point along the selected ray and an estimated size of the protrusion.

In another embodiment of the present invention, a system for visualizing a protrusion in a medical image, comprises: a memory device for storing a program; a processor in communication with the memory device, the processor operative with the program to: cast a plurality of rays in an outward direction from a point, wherein the point is inside a protrusion; select at least one of the plurality of rays for determining a location for viewing the protrusion; and determine the location for viewing the protrusion using the selected at least one of the plurality of rays.

One of the plurality of rays that has traveled a shortest distance from the point to a surface of the protrusion is selected to determine the location for viewing the protrusion. A group of rays that has traveled a shortest average distance from the point to a surface of the protrusion is selected to determine the location for viewing the protrusion. The location for viewing the protrusion is determined by selecting a point along an extended direction of the selected at least one of the plurality of rays. The selected point is one of a fixed distance from the surface of the protrusion and a longest the ray can be extended within the air to the fixed distance, wherein the fixed distance is based on an estimated size of the protrusion.

At least one of the plurality of rays is selected for determining a direction for viewing the protrusion. One of the plurality of rays that has traveled a shortest distance from the point to a surface of the protrusion is selected to determine the direction for viewing the protrusion. An opposite direction of the selected at least one of the plurality of rays determines the direction for viewing the protrusion. A group of rays that has traveled a shortest average distance from the point to a surface of the protrusion is selected to determine the direction for viewing the protrusion.

When a surface point on the protrusion is determined by one of the selected rays and a group of rays, a second plurality of rays is cast from the surface point into an air region of a lumen, wherein a longest ray of the second plurality of rays is selected for determining the location and the direction for viewing the protrusion, wherein the direction for viewing the protrusion is opposite the direction of the selected longest ray. The location is determined using one of a point along the selected ray and an estimated size of the protrusion.

In yet another embodiment of the present invention, a computer program product comprising a computer useable medium having computer program logic recorded thereon for visualizing a protrusion in a medical image, the computer program logic comprising: program code for casting a plurality of rays in one of a spherical and ellipsoidal pattern from a point, wherein the point is inside a protrusion; program code for selecting at least one of the plurality of rays for determining a direction for viewing the protrusion; and program code for determining the direction for viewing the protrusion using the selected at least one of the plurality of rays.

One of the plurality of rays that has traveled a shortest distance from the point to a surface of the protrusion is selected to determine the direction for viewing the protrusion. A group of rays that has traveled a shortest average distance from the point to a surface of the protrusion is selected to determine the direction for viewing the protrusion.

An opposite direction of the selected at least one of the plurality of rays determines the direction for viewing the protrusion. At least one of the plurality of rays is selected for determining a location for viewing the protrusion. One of the plurality of rays that has traveled a shortest distance from the point to a surface of the protrusion is selected to determine the location for viewing the protrusion.

A group of rays that has traveled a shortest average distance from the point to a surface of the protrusion is selected to determine the location for viewing the protrusion. The location for viewing the protrusion is determined by selecting a point along an extended direction of the selected at least one of the plurality of rays. The selected point is one of a fixed distance from the surface of the protrusion and a longest the ray can be extended within the air to the fixed distance, wherein the fixed distance is based on an estimated size of the protrusion.

When a surface point on the protrusion is determined by one of the selected rays and a group of rays a second plurality of rays is cast from the surface point into an air region of a lumen, wherein a longest ray of the second plurality of rays is selected for determining the location with the direction for viewing the protrusion, wherein the direction for viewing the protrusion is opposite the direction of the selected longest ray. The location is determined using one of a point along the selected rays and an estimated size of the protrusion.

In another embodiment of the present invention, a system for determining a location and a direction for viewing a protrusion, comprises: means for casting a plurality of rays in an outward direction from a point, wherein the point is inside a protrusion; means for selecting at least one of the plurality of rays for determining a location and a direction for viewing the protrusion; and means for determining the location and the direction for viewing the protrusion using the selected at least one of the plurality of rays.

In yet another embodiment of the present invention, a method for determining a location and a direction for viewing a polyp in an image of a colon, comprises: acquiring the image of the colon, wherein the image is acquired by one of a computed tomographic (CT), helical CT, x-ray, positron emission tomographic, fluoroscopic, ultrasound, and magnetic resonance (MR) imaging technique; detecting the polyp using a computer-aided polyp detection technique; casting a plurality of rays from a point within the polyp, wherein the plurality of rays are cast in one of a spherical and an ellipsoidal pattern; selecting a ray that has traveled a shortest distance from the point to a surface of the polyp, wherein one of the plurality of rays that has traveled a shortest distance from the point to a surface of the polyp is selected to determine the location and the direction for viewing the polyp; determining the location and the direction for viewing the polyp using the selected ray, wherein an opposite direction of the selected ray determines the direction for viewing the polyp and the location for viewing is determined by selecting a point along an extended direction of the selected ray, wherein the selected point is one of a fixed distance from the surface of the polyp; and viewing the polyp from the determined location and direction for viewing the polyp, when performing a virtual navigation of the colon.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
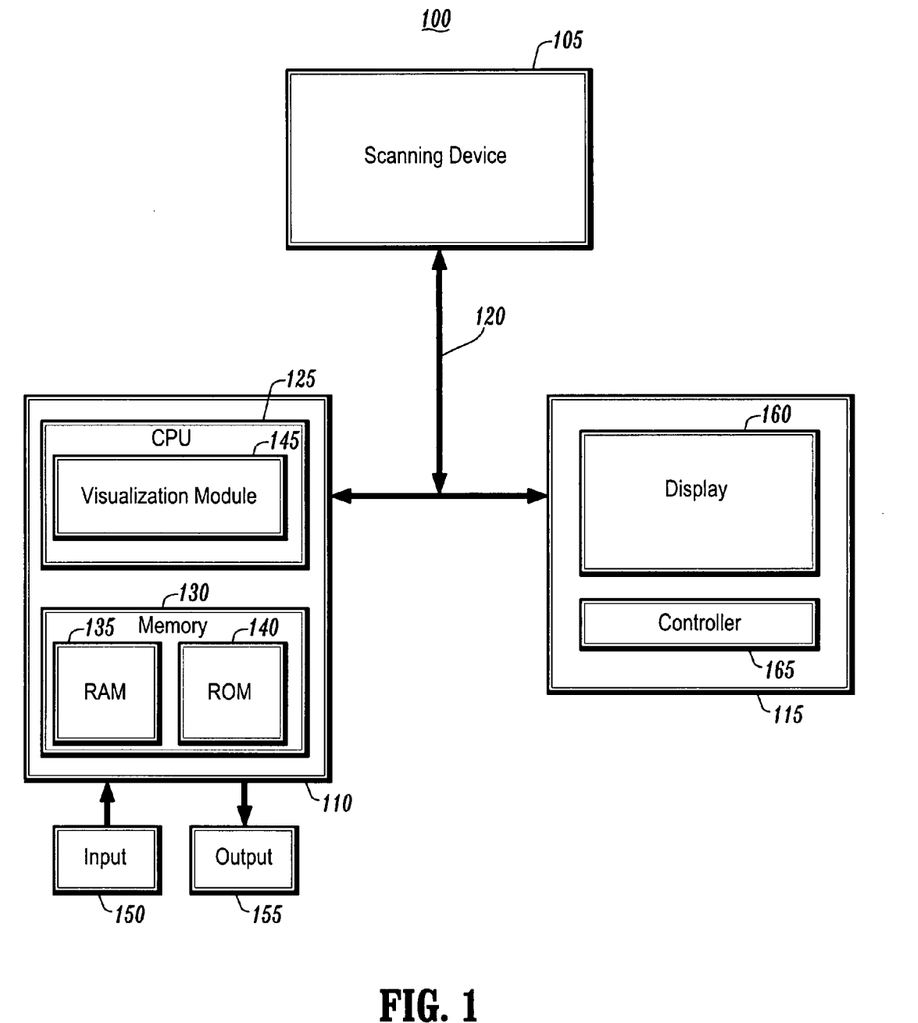
FIG. 1 is a block diagram of a system for determining a location and a direction for viewing a protrusion according to an exemplary embodiment of the present invention.

FIG. 1 is a block diagram of a system 100 for determining a location and a direction for viewing a protrusion according to an exemplary embodiment of the present invention. As shown in FIG. 1, the system 100 includes, inter alia, a scanning device 105, a personal computer (PC) 110 and an operator's console and/or virtual navigation terminal 115 connected over, for example, an Ethernet network 120. The scanning device 105 may be a magnetic resonance imaging (MRI) device, a computed tomography (CT) imaging device, a helical CT device, a positron emission tomography (PET) device, a two-dimensional (2D) or three-dimensional (3D) fluoroscopic imaging device, a 2D, 3D, or four-dimensional (4D) ultrasound imaging device, or an x-ray device, etc.

The PC 110, which may be a portable or laptop computer, a personal digital assistant (PDA), etc., includes a central processing unit (CPU) 125 and a memory 130, which are connected to an input 150 and an output 155. The CPU 125 includes a visualization module 145 that includes one or more methods for determining a location and a direction for viewing a protrusion in a medical image. The CPU 125 may also include a detection module, which is a computer-aided detection (CAD) module for detecting protrusions such as polyps in a medical image, and a diagnostic module, which is used to perform automated diagnostic or evaluation functions of medical image data.

The memory 130 includes a random access memory (RAM) 135 and a read only memory (ROM) 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The input 150 is constituted by a keyboard, mouse, etc., and the output 155 is constituted by a liquid crystal display (LCD), cathode ray tube (CRT) display, printer, etc.

The operation of the system 100 is controlled from the virtual navigation terminal 115, which includes a controller 165, for example, a keyboard, and a display 160, for example, a CRT display. The virtual navigation terminal 115 communicates with the PC 110 and the scanning device 105 so that 2D image data collected by the scanning device 105 can be rendered into 3D data by the PC 110 and viewed on the display 160. It is to be understood that the PC 110 can be configured to operate and display information provided by the scanning device 105 absent the virtual navigation terminal 115, using, for example, the input 150 and output 155 devices to execute certain tasks performed by the controller 165 and display 160.

The virtual navigation terminal 115 further includes any suitable image rendering system/tool/application that can process digital image data of an acquired image dataset (or portion thereof) to generate and display 2D and/or 3D images on the display 160. More specifically, the image rendering system may be an application that provides 2D/3D rendering and visualization of medical image data, and which executes on a general purpose or specific computer workstation. Moreover, the image rendering system enables a user to navigate through a 3D image or a plurality of 2D image slices. The PC 110 may also include an image rendering system/tool/application for processing digital image data of an acquired image dataset to generate and display 2D and/or 3D images.

As shown in FIG. 1, the visualization module 145 is also used by the PC 110 to receive and process digital medical image data, which as noted above, may be in the form of raw image data, 2D reconstructed data (e.g., axial slices), or 3D reconstructed data such as volumetric image data or multiplanar reformats, or any combination of such formats. The data processing results can be output from the PC 110 via the network 120 to an image rendering system in the virtual navigation terminal 115 for generating 2D and/or 3D renderings of image data in accordance with the data processing results, such as segmentation of organs or anatomical structures, color or intensity variations, and so forth.

It is to be understood that CAD systems and methods according to the present invention for determining a location and a direction for viewing a protrusion in a medical image may be implemented as extensions or alternatives such as manual selection to conventional CAD methods or other automated visualization and detection methods for processing image data. Further, it is to be appreciated that the exemplary systems and methods described herein can be readily implemented with 3D medical images and CAD systems or applications that are adapted for a wide range of imaging modalities (e.g., CT, MRI, etc.) and for diagnosing and evaluating various abnormal anatomical structures or lesions such as colonic polyps, aneurysms, lung nodules, etc. In this regard, although exemplary embodiments may be described herein with reference to particular imaging modalities or particular anatomical features, nothing should be construed as limiting the scope of the invention.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

Figure 2:
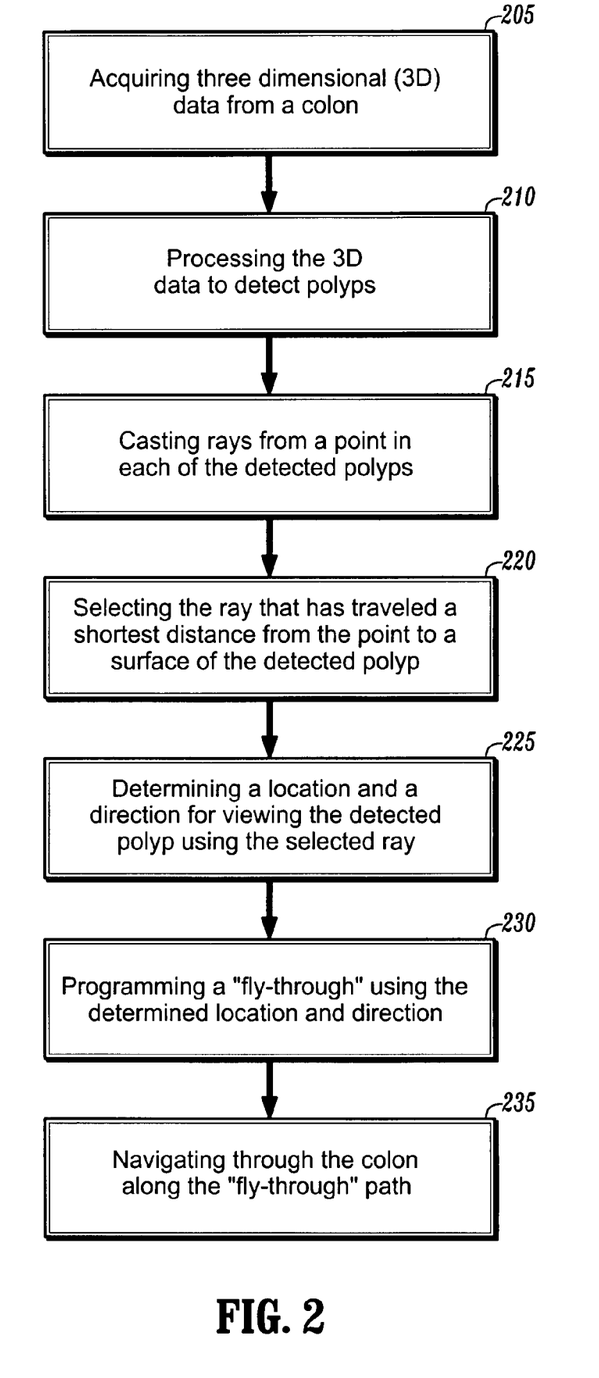
FIG. 2 is a flowchart illustrating a method for determining a location and a direction for viewing a protrusion according to an exemplary embodiment of the present invention.

FIG. 2 is a flowchart showing an operation of a method for determining a location and a direction for viewing a protrusion in a medical image according to an exemplary embodiment of the present invention. As shown in FIG. 2, 3D data is acquired from a medical image of a protrusion, which in this example is a colon (step 205). This is accomplished by using the scanning device 105, for example a CT scanner, operated at the virtual navigation terminal 115, to scan the colon thereby generating a series of 2D images associated with the colon. The 2D images of the colon may then be converted or transformed into a 3D rendered image. It is to be understood that the medical image can be a lumen, which can be in addition to a colon, any one of a pancreas, a bronchi, a larynx, a trachea, a sinus, an ear canal, a blood vessel, a urethra and a bladder, etc. The medical image can also be a non-tubular structure, such as the lung-parenchyma or liver.

After the 3D data is acquired from the colon, the 3D data of the colon is processed to detect polyps (step 210). More specifically, polyps are detected using a conventional (CAD) technique. It is to be understood that a variety of conventional CAD techniques may be used in accordance with the present invention. In addition, during step 210 a medical expert can manually select polyps from the medical image, for example, by selecting a portion of the medical image using a mouse or a computer input means such as the input 150.

Figure 3:
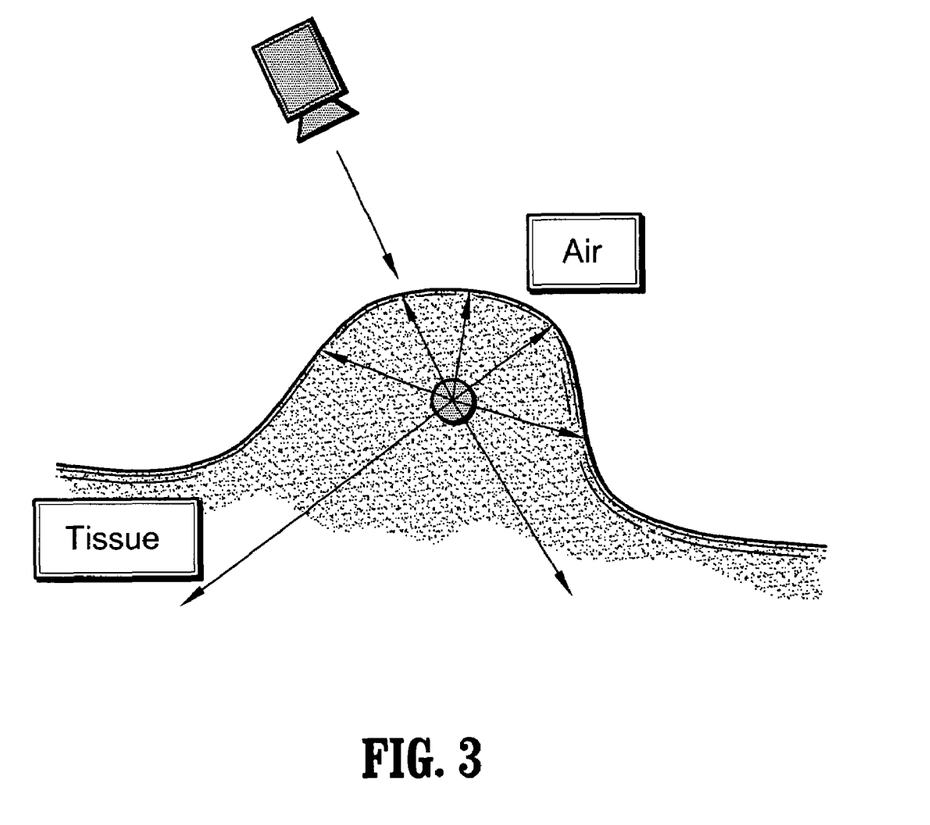
FIG. 3 illustrates determining a location and a direction for viewing a protrusion according to an exemplary embodiment of the present invention.

As further shown in FIG. 2, after data associated with the polyps has been received, rays are cast from a point (e.g., a center point) in each of the polyps (step 215). The points may be provided to an operator of the virtual navigation terminal 15 after the operator requests such data. The operator may also manually select the point within a polyp by marking, for example, the center of a 2D image of the polyp to view a 3D endoscopic rendering of the polyp as discussed above in step 210. The rays are then cast using a ray-casting technique in a spherical pattern and/or formation. The rays may be cast in an ellipsoidal pattern when, for example, the data is anisotropic. An example of a plurality of rays being cast from a center point in a polyp is shown in FIG. 3 and will be discussed in more detail hereinafter.

Each ray cast from the center point of the polyp or polyps is defined as a point and a direction. The rays pass through solid objects such as tissue but stop at air. As shown in FIG. 3, the rays start at the center point and continue in an assigned direction until the rays hit air. An exemplary ray may be defined mathematically as $P+t*V$, where $P=(a,b,c)$ is the point, and $V=(x,y,z)$ is the vector defining the direction. Different directions are sampled by systematically incrementing the angles of elevation and azimuth to cover all possible directions. The length is defined as the maximum value for t such that the vector remains within the polyp and does not touch air.

After the rays have been cast from the points in each of the polyps, a ray that has traveled the shortest distance from the points to the surface of the polyps is selected (step 220). Each ray is cast and/or extended from, for example, the point until it intersects the surface of the colon. The distance from the point to the surface of the colon is the stopping distance. Thus, the ray with the shortest length is the ray with the shortest stopping distance. Alternatively, a group of rays having the shortest average length can be selected in step 220, for example, by averaging the stopping distances of several groups of N rays, where N is a predetermined number. After the averages are taken, the group with the shortest average or mean stopping distance will be chosen.

Determining the distance from a point in a polyp to the polyp's surface can be defined using a variety of methods. In one method, a gradient difference can be used to determine the stopping point and thus be used to determine which ray or group of rays are to be selected in step 220. This is accomplished by using standard methods of computing the gradient of an image. Sharp edges, such as the boundary between the air and the colon wall and/or tissue, which tend to have high gradients, are more easily identified. Thus, gradients exceeding a predetermined threshold set, for example, at higher gradient magnitudes, become the stopping distance of the rays.

In another method, an air threshold can be used to determine the stopping distance of the rays. For example, the scanning device 105 can be calibrated so that air will have a certain value or range of values in an acquired image, and soft tissue such as blood will have a different value or range of values. After calibrating the scanning device 105, a threshold can be set that falls at a midpoint between the values of air and the value of soft tissue that is optimal for segmenting a colon, and thus, enables the stopping distance of rays to be determined. In another alternative, when a CAD technique is employed, only the rays that intersect a "voting surface" of a detected polyp will be used to determine the stopping distance and thus the shortest ray thereof will be selected. The "voting surface" is defined as an intersection of the voxels of the surface of the colon with those voxels that lead to the detection of a polyp, which vary by the CAD technique employed. Such a technique is disclosed in U.S. patent application Ser. No. 10/869,285, entitled, "Method and System for Response Image Feature Collection and Candidate Summit, Surface and Core Estimation," a copy of which is herein incorporated by reference.

As further shown in FIG. 2, once the ray or group of rays is selected, a location and a direction for viewing the detected polyps are determined using the selected ray or group of rays (step 225). In other words, the distance from the polyps from which to place the virtual camera and the direction from which to angle the camera for viewing the polyps is determined. It is to be understood that the distance from a polyp, which is typically equal to the shortest distance from the center point in the polyp to the polyp's surface, is constrained so that the distance remains within portions of air located in the inner space of the colon. The distance may also be set to a fixed value for all detected and/or marked polyps.

Figure 4A:
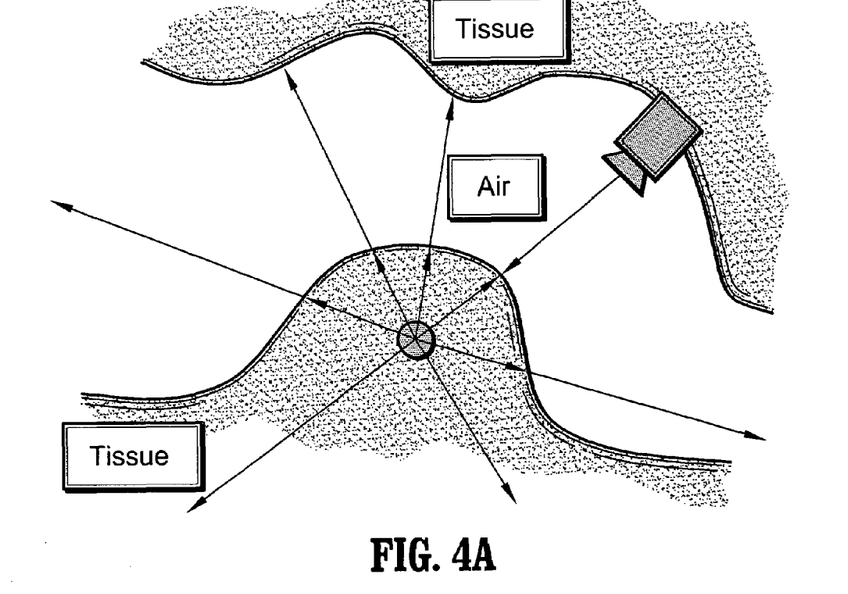
FIG. 4A is another illustration of determining a location and a direction for viewing a protrusion according to an exemplary embodiment of the present invention.

The shortest ray and/or group of rays defines a direction from the center point of the polyp outwards. As a result, the point chosen along the shortest ray determines the viewing location in the air portion of the colon, and the opposite direction of the shortest ray determines the viewing direction. More specifically, a rendering direction of the shortest ray is the inverse thereof, thus the camera is positioned so that it is looking back at the polyp as shown in FIG. 3. For example, the viewing location is determined by extending the shortest ray within the air space of the colon (as shown in FIG. 4A) and determining a location along this ray that remains within the air space and allows the entire polyp to be in view of the camera shown, for example, in FIG. 4A. The shortest ray can be extended from the surface of the polyp until either: (1) the ray hits the opposite wall of the colon, or (2) the entire polyp is in view, depending on which event occurs first. It is to be understood that determining whether the entire polyp is in view depends on the chosen field of view for the camera that is being simulated and the assumed diameter of the polyp. The diameter may be set at a default value, such as one centimeter, or may be estimated by conventional methods.

Figure 4B:
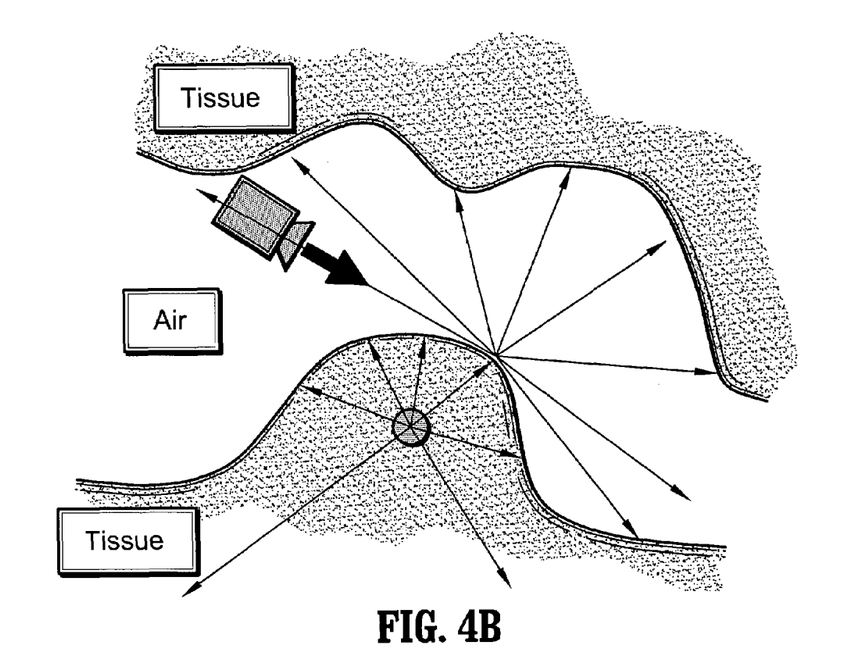
FIG. 4B is yet another illustration of determining a location and a direction for viewing a protrusion according to an exemplary embodiment of the present invention

FIG. 4B illustrates yet another method for determining the location and direction for viewing the detected polyps. As shown in FIG. 4B, a spherical set of rays are cast from a surface point of intersection (at the polyp's surface) of a shortest ray. The rays travel through the air until they hit a solid surface. The longest ray of a group of rays is then used to determine the virtual camera's location and direction for viewing. The location is selected as a point along the ray, which can be a fixed distance within the air region, or it can be variable based on an estimated polyp size.

Figure 5:
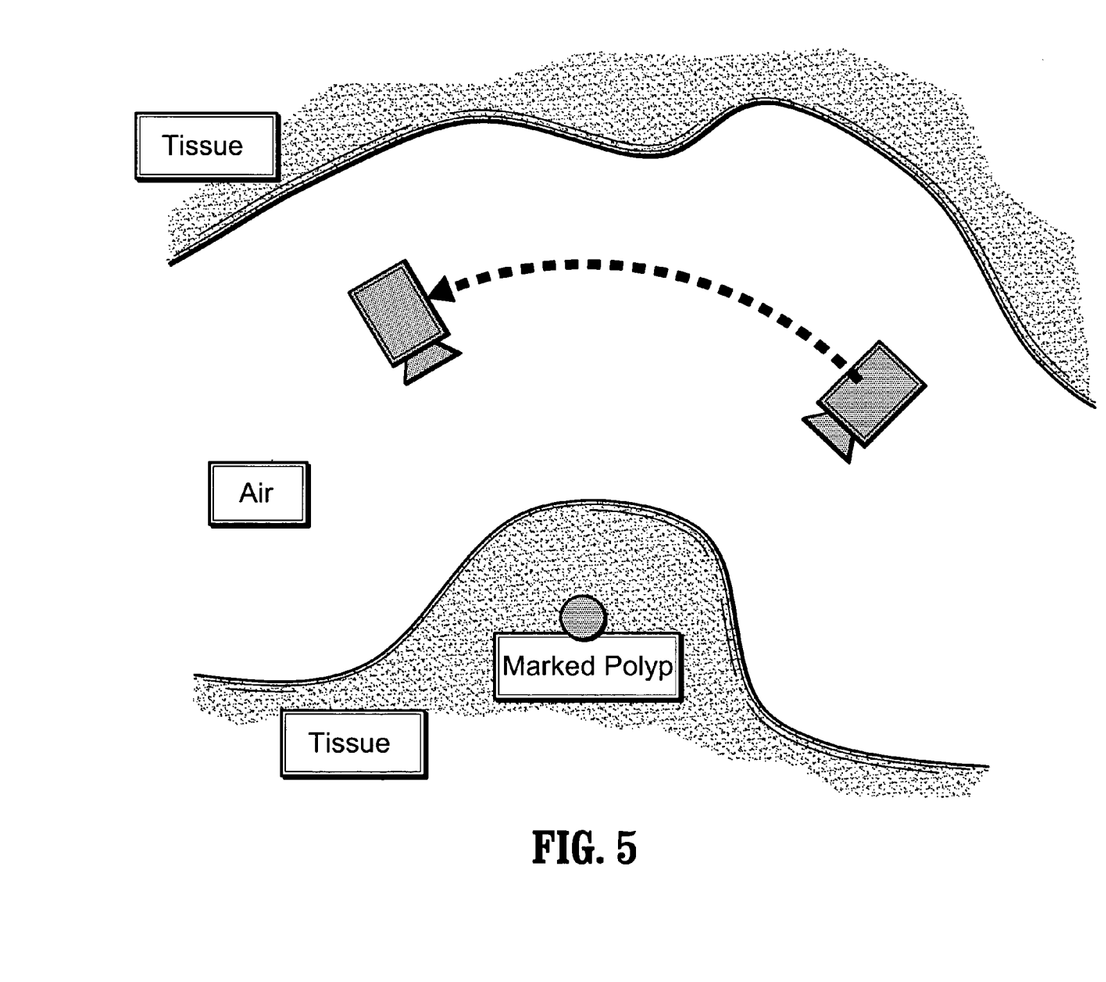
FIG. 5 illustrates "flying-around" a marked polyp in a colon.

After step 225, the determined locations and directions for viewing detected polyps are then used to augment an existing or used to create a new "fly-through" program for navigating through the colon or any other lumen (step 230). Prior to generating the "fly-through" program the data associated with the determined locations and directions for viewing the detected polyps can be stored, for example, in the memory 130 of the CPU 125 for further manipulation and/or analysis. In addition, given the data acquired in step 225, a few additional actions may occur: (1) it can be used by the operator of the virtual navigation terminal 115 to instantly view each polyp that has been marked and/or detected or (2) it can be used to provide a cine around the polyp to allow a medical expert to view the polyp from several sides and/or angles as shown in FIG. 5.

Figure 6:
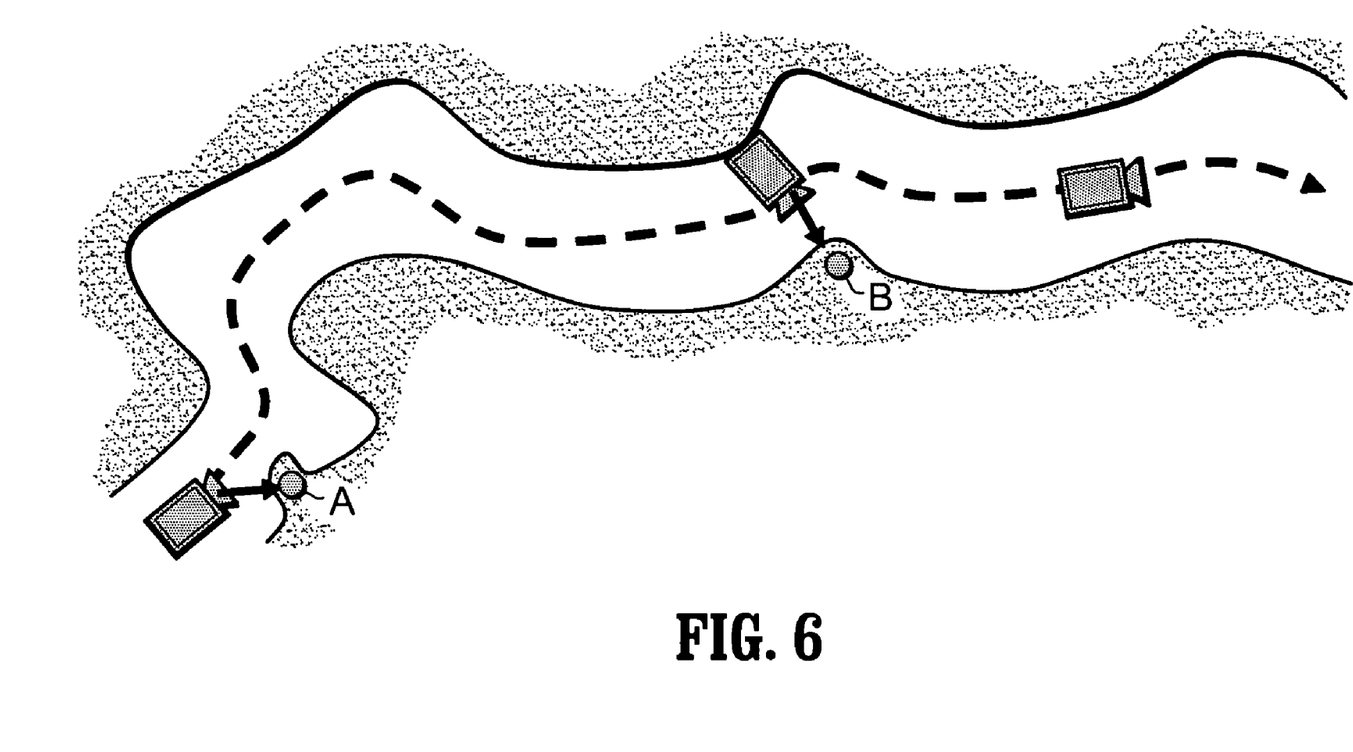
FIG. 6 illustrates "flying-through" a colon in accordance with an exemplary embodiment of the present invention.

Once the "fly-through" has been programmed, a medical expert can navigate through the colon along the "fly-through" path (step 235). In other words, the operator of the virtual navigation terminal 115 performs a planned or guided navigation according to the "fly-through" of the virtual organ being examined as shown in FIG. 6. As shown in FIG. 6, the "fly-through" immediately proceeds to a first location (A) (i.e., the first determined location for viewing) in the virtual organ, thus bringing the operator directly to a detected polyp for viewing. At this point, the "fly-through" will pause and allow the operator to view the detected polyp (i.e., to view the polyp using the determined direction for viewing) and then proceed to a second location (B) for viewing and so forth. In addition, the "fly-through" may provide a level of interaction with the virtual camera, so that the virtual camera can navigate through a virtual environment automatically in the case of no operator interaction, and yet, allow the operator to manipulate the camera when necessary.

In accordance with the present invention, a location and a direction for viewing protrusions can be automatically determined and used to create and/or augment a program associated with virtual navigation of a lumen. For example, a "fly-through" programmed with location and direction information in accordance with the present invention, enables an operator of a virtual navigation terminal to proceed directly to protrusions that have been detected using a conventional CAD technique without having to manually navigate a virtual camera through a lumen. Accordingly, conventional CAD systems can be enhanced by employing the present invention to create and/or augment a program associated with virtual navigation of a lumen to improve the speed at which a user can parse through detected protrusions and to examine previously detected protrusions.

It is to be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention. It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for determining a location of a virtual camera and a direction in which to point the virtual camera for viewing a protrusion, comprising:

casting a plurality of rays in an outward direction from a point, wherein the point is inside a protrusion, wherein each ray is mathematically defined;

selecting a ray that has traveled a shortest distance from the point to a surface of the protrusion or a group of rays that has traveled a shortest average distance from the point to the surface of the protrusion; and determining a location of a virtual camera and a direction in which to point the virtual camera for viewing the protrusion by using the selected ray or group of rays.

2. The method of claim 1, wherein the plurality of rays are cast in one of a spherical and an ellipsoidal formation.

3. The method of claim 1, wherein the protrusion is one of a nodule, lesion, polyp, pre-cancerous growth, and cancerous growth.

4. The method of claim 1, further comprising:
acquiring a medical image comprising the protrusion.

5. The method of claim 4, wherein the medical image is acquired by one of a computed tomographic (CT), helical CT, x-ray, positron emission tomographic, fluoroscopic, ultrasound, and magnetic resonance (MR) imaging technique.

6. The method of claim 1, further comprising:
detecting the protrusion using a computer-aided protrusion detection technique.

7. The method of claim 1, wherein the point is manually selected by a user.

8. The method of claim 1, wherein the point is a center-point of the protrusion.

9. The method of claim 1, wherein the ray that has traveled the shortest distance from the point to the surface of the protrusion is selected from a group of the plurality of rays that stops at a voting surface of the protrusion.

10. The method of claim 1, wherein a stopping point of a ray of the plurality of rays is determined by using an image gradient wherein the stopping point is used to determine the distance traveled by the ray from the point to the surface of the protrusion.

11. The method of claim 1, wherein a stopping point of a ray of the plurality of rays is determined using an air threshold, wherein the stopping point is used to determine the distance traveled by the ray from the point to the surface of the protrusion.

12. The method of claim 1, wherein an opposite direction of the selected ray or a ray derived from the selected group of rays is the direction in which to point the virtual camera for viewing the protrusion.

13. The method of claim 1, further comprising:
storing the determined location and direction for viewing the protrusion.

14. The method of claim 1, further comprising:
viewing the protrusion from the determined location in the determined direction.

15. The method of claim 1, wherein the location for viewing the protrusion is a point along the selected ray that has been extended from the surface of the protrusion or is derived from the selected group of rays that has been extended from the surface of the protrusion.

16. The method of claim 15, wherein the point is located at a fixed distance from the surface of the protrusion or at a longest distance the selected ray or group of rays can be extended within an air space that is external to the protrusion.

17. The method of claim 16, wherein the fixed distance is based on an estimated size of the protrusion.

18. The method of claim 1, further comprising:
casting a second plurality of rays from a point on the surface of the protrusion that corresponds to an intersection point of the selected ray into an air region of a lumens;
selecting a ray from the second plurality of rays that has traveled a longest distance from the point to a wall of the lumen; and
determining the location of the virtual camera and the direction in which to point the virtual camera for viewing the protrusion by using the selected longest ray.

19. The method of claim 18, wherein the second plurality of rays is cast in one of a spherical and an ellipsoidal formation.

20. The method of claim 18, wherein the direction in which to point the virtual camera for viewing the protrusion is opposite the direction of the selected longest ray.

21. The method of claim 20, wherein the location of the virtual camera is a point along the selected longest ray.

22. A system for determining a location of a virtual camera and a direction in which to point the virtual camera for viewing a protrusion, comprising:
a memory device for storing a program;
a processor in communication with the memory device, the processor operative with the program to:
cast a plurality of rays in an outward direction from a point, wherein the point is inside a protrusion, wherein each ray is mathematically defined;
select a ray that has traveled a shortest distance from the point to a surface of the protrusion or a group of rays that has traveled a shortest average distance from the point to the surface of the protrusion; and
determine a location of a virtual camera and a direction in which to point the virtual camera for viewing the protrusion by using the selected ray or group of rays.

23. The system of claim 22, wherein the location for viewing the protrusion is a point along the selected ray that has been extended from the surface of the protrusion or is derived from the selected group of rays that has been extended from the surface of the protrusion.

24. The method of claim 23, wherein the point is located at a fixed distance from the surface of the protrusion and or at a longest distance the selected ray or group of rays can be extended within an air space that is external to the protrusion.

25. The system of claim 22, wherein an opposite direction of the selected ray or a ray derived from the selected group of rays is the direction in which to point the virtual camera for viewing the protrusion.

26. The system of claim 22, wherein the processor is further operative with the program to:
cast a second plurality of rays from a point on the surface of the protrusion that corresponds to an intersection point of the selected ray into an air region of a lumen;
select a ray from the second plurality of rays that has traveled a longest distance from the point to a wall of the lumen; and
determine the location of the virtual camera and the direction in which to point the virtual camera for viewing the protrusion by using the selected longest ray.

27. The method of claim 26, wherein the direction in which to point the virtual camera for viewing the protrusion is opposite the direction of the selected longest ray and the location of the virtual camera is a point along the selected longest ray.

28. A computer program product comprising a computer useable medium having computer program logic recorded thereon for determining a location of a virtual camera and a direction in which to point the virtual camera for viewing a protrusion, the computer program logic comprising:
program code for casting a plurality of rays from a point, wherein the point is inside a protrusion, wherein each ray is mathematically defined;

program code for selecting a ray that has traveled a shortest distance from the point to a surface of the protrusion or a group of rays that has traveled a shortest average distance from the point to the surface of the protrusion; and program code for determining a location of a virtual camera and a direction in which to point the virtual camera for viewing the protrusion by using the selected ray or group of rays.

29. The computer program product of claim 28, wherein an opposite direction of the selected ray or a ray derived from the selected group of rays is the direction in which to point the virtual camera for viewing the protrusion.

30. The computer program product of claim 28, wherein the location for viewing the protrusion is a point along of the selected ray that has been extended from the surface of the protrusion or is derived from the selected group of rays that has been extended from the surface of the protrusion.

31. The computer program product of claim 30, wherein the point is located at a fixed distance from the surface of the protrusion or at a longest distance the selected ray or group of rays can be extended within an air space that is external to the protrusion.

32. The computer program product of claim 28, further comprising:

program code for casting a second plurality of rays from a point on the surface of the protrusion that corresponds to an intersection point of the selected ray into an air region of a lumen;

program code for selecting a ray from the second plurality of rays that has traveled a longest distance from the point to a wall of the lumen; and program code for determining the location of the virtual camera and the direction in which to point the virtual camera for viewing the protrusion by using the selected longest ray.

33. The computer program product of claim 32, wherein the direction in which to point the virtual camera for viewing the protrusion is opposite the direction of the selected longest ray and the location of the virtual camera is a point along the selected longest ray.

34. A system for determining a location of a virtual camera and a direction in which to point the virtual camera for viewing a protrusion, comprising:

means for casting a plurality of rays in an outward direction from a point, wherein the point is inside a protrusion, wherein each ray is mathematically defined;

means for selecting a ray that has traveled a shortest distance from the point to a surface of the protrusion or a group of rays that has traveled a shortest average distance from the point to the surface of the protrusion; and means for determining a location of a virtual camera and a direction in which to point the virtual camera for viewing the protrusion by using the selected ray or group of rays.

35. A method for visualizing polyps while navigating a virtual camera through an image of a colon, comprising:

acquiring an image of a colon;

detecting first and second polyps in the colon;

for each polyp:

casting a plurality of rays from a point within the polyp, wherein each ray is mathematically defined;

selecting a ray that has traveled a shortest distance from the point to a surface of the polyp or a group of rays that has traveled a shortest average distance from the point to the surface of the polyp; and determining a location of a virtual camera and a direction in which to point the virtual camera for viewing the polyp by using the selected ray or group of rays; and generating a fly-through, the fly-through including a path along which the virtual camera is to be navigated through the colon, wherein the fly-through is programmed with the determined locations and directions for the first and second polyps.

36. The method of claim 1, wherein the location and direction are determined before navigating the virtual camera along a predetermined flight path to the protrusion.

37. The method of claim 35, further comprising:

executing the fly-through and navigating the virtual camera directly to the first determined location, wherein at the first determined location, the fly-through pauses and allows a user to view the first polyp in the first determined direction, wherein after the first polyp has been viewed the fly-through navigates the virtual camera directly to the second determined location, wherein at the second determined location, the fly-through pauses and allows the user to view the second polyp in the second determined direction.

* * * * *